United States Patent [19]

Sato

[11] Patent Number: 4,921,417
[45] Date of Patent: May 1, 1990

[54] MOLDING APPARATUS FOR MOLDING A CLAY PIGEON

[75] Inventor: Akiyoshi Sato, Nagano, Japan

[73] Assignee: Sato Factory Co., Ltd., Nagano, Japan

[21] Appl. No.: 287,541

[22] Filed: Dec. 19, 1988

Related U.S. Application Data

[62] Division of Ser. No. 104,259, Oct. 5, 1987, abandoned.

[51] Int. Cl.$^5$ .................................. B29C 45/77
[52] U.S. Cl. ......................... 425/145; 264/81;
264/328.13; 425/449; 425/543; 425/549;
425/555; 425/584
[58] Field of Search ............... 264/78, 81, 328.13;
425/405.1, 449, 447, 145, 149, 543, 547, 549,
555, 584, 566

[56] References Cited

U.S. PATENT DOCUMENTS

| | | | |
|---|---|---|---|
| 571,958 | 11/1896 | Saylor | 273/362 |
| 3,125,780 | 3/1964 | Harrison et al. | 425/584 |
| 3,469,411 | 9/1969 | Silva | 273/362 |
| 3,788,790 | 1/1974 | Balevsky et al. | 425/584 |
| 4,276,015 | 6/1981 | Rogers | 425/566 |
| 4,623,150 | 11/1986 | Moehlmann et al. | 273/362 |

FOREIGN PATENT DOCUMENTS

| | | |
|---|---|---|
| 61-162538 | 7/1986 | Japan . |
| 6317399 | 9/1986 | Japan . |
| 6368244 | 9/1986 | Japan . |
| 1198241 | 7/1970 | Switzerland .................. 425/584 |

Primary Examiner—Jay H. Woo
Assistant Examiner—Timothy W. Heitbrink
Attorney, Agent, or Firm—Birch, Stewart, Kolasch & Birch

[57] ABSTRACT

A molding apparatus for molding a clay pigeon includes a bypass tube having a tip disposed in a blow orifice communicating with a cavity of a metal mold in the form of the clay pigeon. The bypass tube has a diameter smaller than that of the blow orifice and compressed air, which leads molding material in the blow orifice, passes therethrough in order to supply the molding material mixture of at least sand and hardening agent to the cavity, whereby corners and details of the cavity are satisfactorily filled with the molding material supplied to the cavity.

1 Claim, 4 Drawing Sheets

MOLDING APPARATUS FOR MOLDING A CLAY PIGEON

This application is a divisional of application Ser. No. 104,259, filed on Oct. 5, 1987, now abandoned.

BACKGROUND OF THE INVENTION

1. Field of the Invention

The present invention relates to a molding apparatus for molding a clay Pigeon which is flown in the air so as to be used as a target for shooting.

2. Description of the Relevant Art

China of unglazed clay or soil, ice and asphalt are known for use as material for a clay pigeon.

In addition, molding apparatuses which utilize a mold and form the target by using pressure are known. However, in the prior art devices, it is difficult to cause sand to permeate into the corners and details of the mold when the product has a sharp corner, as in a clay pigeon. Accordingly, there is a problem in molding a clay pigeon of high quality due to poor filling of the mold with sand.

SUMMARY OF THE INVENTION

It is an object of the present invention to provide a molding apparatus for molding a clay pigeon which can cause molding material to permeate into corners and details of a cavity having a complicated and precise shape so that a clay pigeon having high accuracy and high quality can be manufactured and inferior products due to poor filling with molding material will not be produced.

Further, it is another object of the present invention to provide a molding apparatus for molding a clay pigeon which can be implemented by the addition of a tube member to a basic configuration of an existing molding apparatus, which can be done inexpensively.

In order to achieve the above objects, the molding apparatus of the clay pigeon according to the present invention is characterized by the provision of a tank for accommodating molding material made up of a mixture of at least sand and hardening agent, a compressor for supplying compressed air to a duct disposed above the tank, a metal mold having a cavity in the form of a clay pigeon, a blow orifice for communicating the metal mold with a lower portion of the tank, and a bypass tube having a tip disposed in the blow orifice and having a smaller diameter than that of the blow orifice and through which compressed air for leading the molding material into the blow orifice passes, whereby corners and details of a cavity are satisfactorily filled with the molding material.

DETAILED DESCRIPTION OF THE EMBODIMENTS

Figure 1:
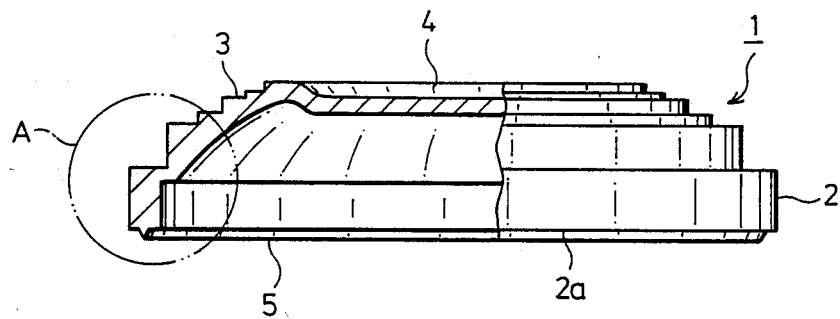
FIG. 1 is a partially broken front view of a clay pigeon manufactured by a molding apparatus according to the present invention.
Figure 2:
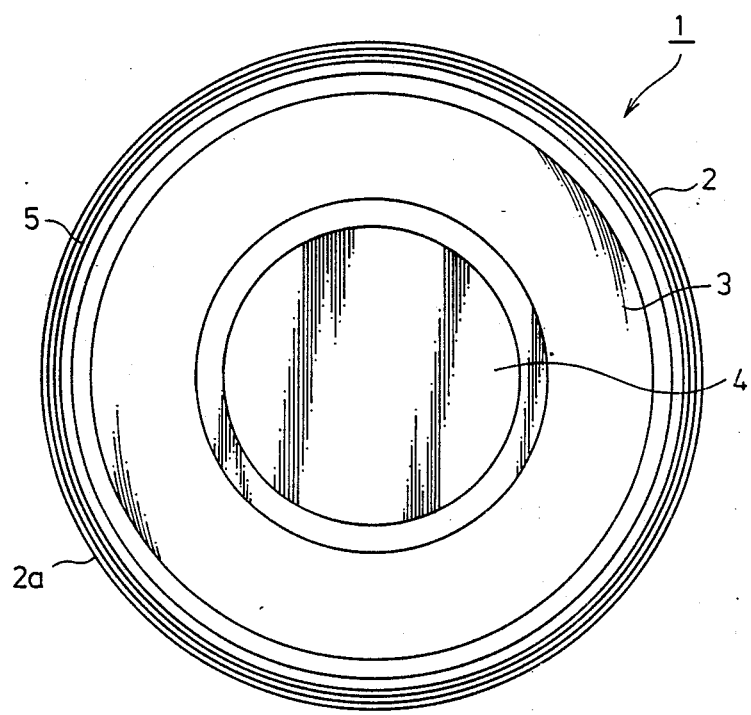
FIG. 2 is a bottom view of the clay pigeon shown in FIG. 1.

In the drawings, like elements are designated by like reference numerals.

First, in order to clarify the present invention, the construction of a clay pigeon for shooting, manufactured by a clay pigeon molding apparatus according to the present invention, is described with reference to FIGS. 1 to 5.

The clay pigeon is in the shape of a disklike plate (having a diameter of 11 cm) inversed and consists of an outline part 2 formed into a ring cylinder, a tapered intermediate part 3 extending from an upper end of the outline part 2 and having an outer surface formed into a step, and a disklike central part 4 dented downward as shown in FIG. 1.

Figure 3:
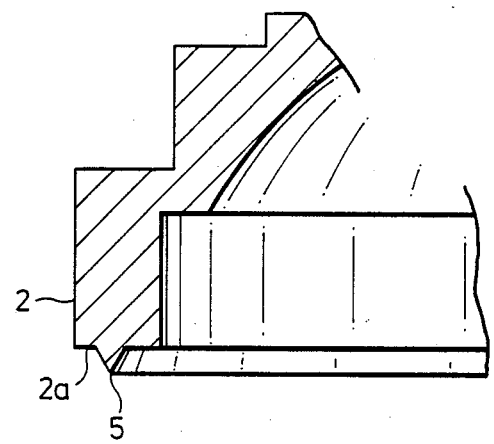
FIG. 3 is an enlarged view of circled part of A in FIG. 1.

The bottom 2a of the outline part 2 is integrally formed with a protective projection part 5 having a section in the form of an inverted triangle and formed along the whole circumference as shown in FIG. 3. This projection part 5 absorbs the shock when the clay pigeon 1 falls slightly on a a base and prevents the clay pigeon 1 from being scratched and chipped in manufacture, transport and firing of a clay pigeon firing apparatus, etc. Therefore, it protects the clay pigeon 1.

Figure 4:
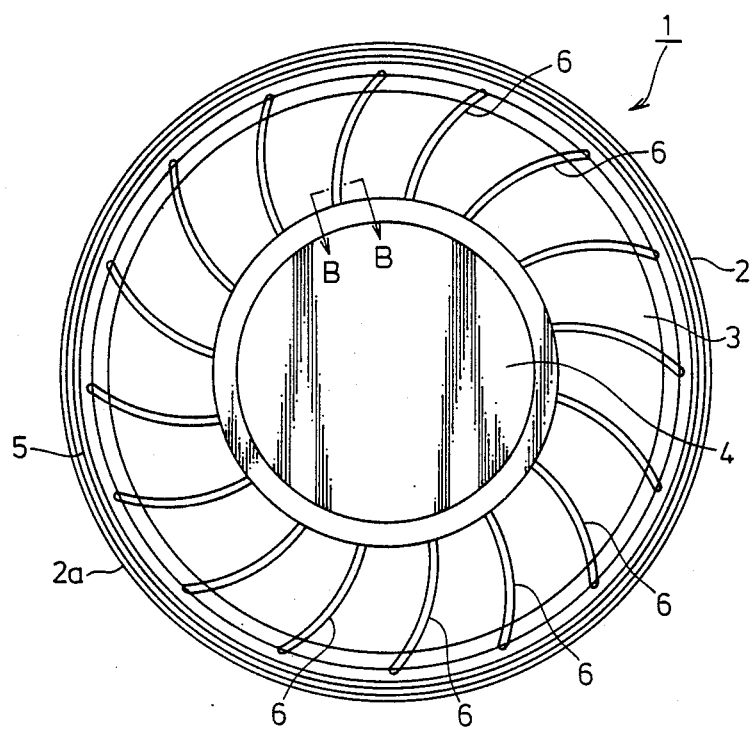
FIG. 4 is a bottom view of a clay pigeon according to another embodiment.
Figure 5:
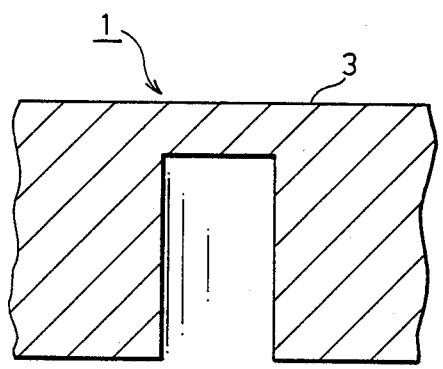
FIG. 5 is a cross sectional view taken along line B—B of FIG. 4.

On the other hand, concave groove lines 6 can be formed radially on the depressed base for another embodiment as shown in FIG. 4. The concave groove lines 6 are formed radially on all parts except the central part 4 plurally at constant intervals. Each of the concave groove lines 6 is curved and is formed like a screw propeller as a whole. Stable flight is ensured by this arrangement and the preferable destruction of the clay pigeon when hit by a shot can be obtained due to the construction of sand, that is, a construction feature providing particle aggregate. Furthermore, the shape of the concave groove lines 6 may be any shape such as a grid or the like and the amount of destruction can be determined by selecting the shape of the concave groove lines 6. The preferable shape of the concave groove lines 6 is a depth of 3.0 mm and a width of 1.5 mm for wall thickness 3.5 mm of the clay pigeon 1 as shown in FIG. 5.

Figure 6B:
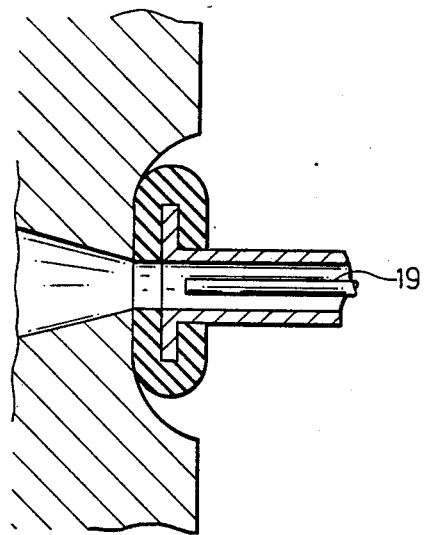
FIG. 6B is an enlarged view of circled part of B in FIG. 6A.
Figure 6A:
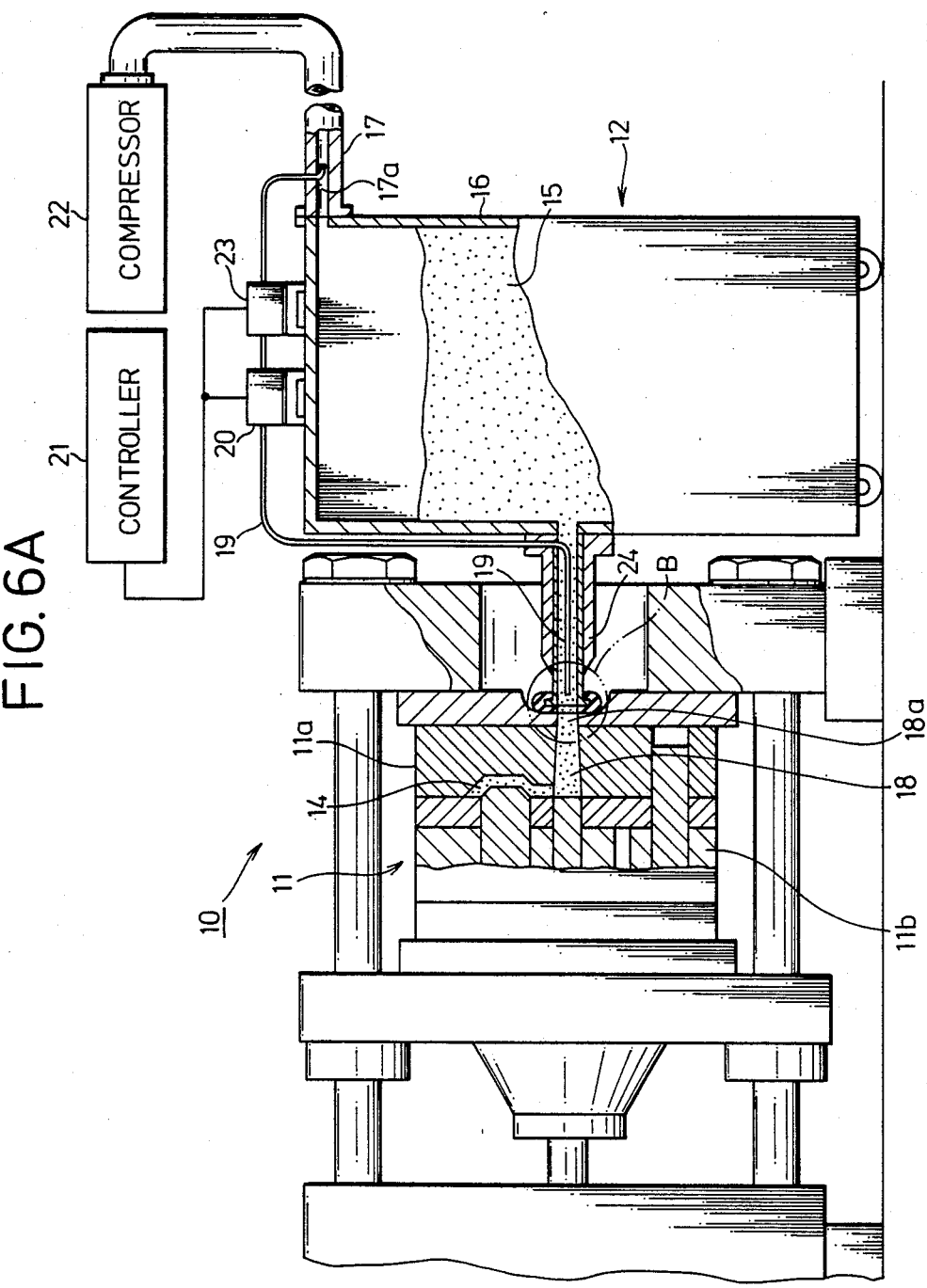
FIG. 6A is a cross sectional view schematically illustrating a molding apparatus of a clay pigeon according to the present invention.

A molding apparatus according to the present invention suitable for manufacturing the clay pigeon 1 for shooting is now described with reference to FIGS. 6A and 6B. The molding apparatus 10 mainly comprises a metal mold 11 and a material blower 12. The metal mold 11 comprises a fixed mold 11a and a movable mold 11b, and a cavity 14 in the form of the clay pigeon 1 is formed between opposite sides of the fixed mold 11a and the movable mold 11b. In addition, the material blower 12 is provided with a tank 16 which accommodates molding material 15 and has a nozzle 24 at a front end thereof, and compressed air is supplied by a compressor 22 through an upper duct 17.

The bottom of the tank 16 communicates with the cavity 14 through a blow orifice 18. Further, the neighborhood of an outlet 17a of the duct 17 is connected with the neighborhood of an inlet 18a of the blow orifice 18 through a bypass tube 19 which bypasses a part of compressed air supplied from the duct 17. The construction near the tiP of the bypass tube 19 is illustrated in FIG. 6B. As shown in FIGS. 6A and 6B, the bypass tube 19 has a front end disposed in blow orifice 18 in parallel with the blow orifice and a rear end disposed in the duct 17 in parallel with said duct. By this arrangement, compressed air is fed from the rear end to the front end of the bypass tube. The air then exists from the front end of the bypass tube in order to lead the sand to the blow orifice. The bypass tube 19 is formed with a diameter so that the blowing of sand cannot be disturbed at the blow orifice 18. The bypass tube 19 leads the movement of sand and a preferable result was obtained by using a bypass tube 19 having an inner diameter of 7 mm for a molding apparatus provided with a duct 17 having an inner diameter of 30 mm as an example. Furthermore, the pressure and flow rate of the air passing through the bypass tube 19 can be adjustable since a pressure regulating valve 20, a flow regulating valve 23 and a controller 21 which controls the pressure regulating valve 20 and the flow regulating valve 23 are provided at the middle part of the bypass tube 19.

A method of manufacturing the clay pigeon 1 by using the molding apparatus 10 is now described.

First, core sand for molding a core to make hollow part of castings is sued as the main material for the clay pigeon 1. Quartz sand having outer diameter of 0.1 to 0.5 mm is used for core sand, but the smaller sand grain is preferable. Further, it is preferable that the core sand itself is painted beforehand.

Hardening agent to harden sand is at least mixed into the core sand. Thermosetting resin, for example, phenol aldehyde resin is used for the hardening agent. By the way, hardening agent to make a core for general use usually includes various additives in order to suppress gas produced in die casting, etc. and the hardening speed of the hardening agent is set around 20 to 40 seconds. Since the hardening agent for the clay pigeon 1 may have only to function to harden sand, any hardening agent of which the speed is about 10 seconds and the cost is cheap can be applied.

The core sand and hardening agent are sufficient for the material of the clay pigeon 1 in the embodiment and the mixture of them can be used for the molding material 15. Furthermore, any additive may be combined if necessary.

In the method of molding clay pigeon 1, the metal mold 11 is heated about 280° C. and compressed air with pressure of 2 to 4 kg/cm$^2$ and supply time of 2 to 3 seconds is supplied into the metal mold 11. The molding material 15 in the tank 16 is supplied to the cavity 14 from the blow orifice 18 with compressed air and the cavity 14 is filled up with the molding material 15.

At this time, a part of the compressed air in the duct 17 is directly introduced into the blow orifice 18 through the bypass tube 19 and it leads the sand to the blow orifice 18. This provides that a clay pigeon 1 of high quality is obtained since the sand is permeated into the corner and detail of the mold in the cavity 14.

Thereafter, sintering of about 10 seconds in the metal mold 11 is performed and the molded product is then taken out. It is noted that an important condition for flying a clay pigeon is that it stand out well in the air. To meet this condition, the sand itself is painted as explained earlier, while the molded product taken out from the metal mold 11 may be further painted again if necessary. In this painting treatment, good painting could not be obtained unless the molded product was cooled enough since oil element oozed from the inside of an asphalt clay pigeon, for example. However, the clay pigeon manufactured by the molding apparatus according to the present invention can be painted before it is cooled and the drying time of the paint is reduced as much as possible.

Although the present invention has been described with respect to a presently preferred embodiment, the present invention should not be limited to the embodiment, and it will be appreciated by those skilled in the art that various modifications may be made without departing from the spirit and scope of the present invention.

What is claimed:

1. A molding apparatus for molding a clay pigeon comprising
    a tank for accommodating a molding material mixture of at least sand and hardening agent,
    a compressor for supplying compressed air to
    a duct connected to an upper portion of said tank,
    a mold having a cavity in the form of the clay pigeon,
    a blow orifice for connecting said mold and a lower portion of said tank,
    a bypass tube having a front end disposed in said blow orifice in parallel with said blow orifice and a rear end disposed in the duct in parallel with said duct a diameter of said bypass tube being smaller than that of said duct and said blow orifice, a part of the compressed air from said compressor passing through said bypass tube to lead blowing of the molding material in the blow orifice, and a pressure regulating valve and/or a flow rate regulating valve disposed in the way of said bypass tube.

* * * * *